United States Patent
Hunt et al.

(10) Patent No.: US 12,320,413 B1
(45) Date of Patent: Jun. 3, 2025

(54) DIFFERENTIAL WITH STAMPED HOUSING

(71) Applicant: Schaeffler Technologies AG & Co. KG, Herzogenaurach (DE)

(72) Inventors: Kenneth Hunt, Orrville, OH (US);
Michael Hodge, Wadsworth, OH (US);
Matthew Fowler, Canton, OH (US);
Greg Copeland, Massillion, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/606,637

(22) Filed: Mar. 15, 2024

(51) Int. Cl.
*F16H 48/40* (2012.01)
*F16H 48/10* (2012.01)
*F16H 48/38* (2012.01)

(52) U.S. Cl.
CPC .............. *F16H 48/10* (2013.01); *F16H 48/40* (2013.01); *F16H 2048/382* (2013.01)

(58) Field of Classification Search
CPC .......... F16H 48/10; F16H 48/40; F16H 48/11; F16H 48/285
See application file for complete search history.

(56) References Cited

U.S. PATENT DOCUMENTS

| | | | | |
|---|---|---|---|---|
| 1,397,066 A | * | 11/1921 | Williams | F16H 48/285 475/249 |
| 1,691,230 A | * | 11/1928 | Dennison | F16H 48/30 475/250 |
| 2,481,873 A | * | 9/1949 | Randall | F16H 48/285 475/252 |
| 4,630,505 A | * | 12/1986 | Williamson | F16H 48/10 475/90 |
| 5,122,101 A | | 6/1992 | Tseng | |
| 5,346,443 A | * | 9/1994 | Crysler | F16H 48/285 475/248 |
| 5,785,624 A | * | 7/1998 | Mayr | F16H 48/285 475/248 |

FOREIGN PATENT DOCUMENTS

| | | | |
|---|---|---|---|
| CN | 115435060 A | * | 12/2022 |
| DE | 4013196 A1 | * | 10/1991 |

* cited by examiner

*Primary Examiner* — Sherry L Estremsky
(74) *Attorney, Agent, or Firm* — Davidson Kappel LLC

(57) ABSTRACT

A differential includes a housing rotatable about a center axis of the differential. The housing includes a first hub section including a base plate and a first hub protruding axially from the base plate; a second hub section including an end plate a second hub protruding axially from the end plate; a plurality of rings stacked together axially between the base plate and the end plate, the plurality of ring being attached to the base plate and the end plate; a first side gear and a second side gear inside of the housing, the first side gear configured for connecting to a first output shaft, the second side gear configured for connecting to a second output shaft; first transmission gears and second transmission gears connected to the housing for rotation with the housing about the center axis, the first transmission gears configured for driving the first side gear, the second transmission gears configured for driving the second side gear, the first transmission gears and second transmission gears being received inside the plurality of rings.

20 Claims, 4 Drawing Sheets

DIFFERENTIAL WITH STAMPED HOUSING

TECHNICAL FIELD

The present disclosure relates generally to motor vehicle drivetrains, and more specifically to differentials for motor vehicle drivetrains.

BACKGROUND

Differential housings on the market are made from castings or forgings.

SUMMARY

A differential is provided including a housing rotatable about a center axis of the differential. The housing includes a first hub section including a base plate and a first hub protruding axially from the base plate; a second hub section including an end plate a second hub protruding axially from the end plate; a plurality of rings stacked together axially between the base plate and the end plate, the plurality of ring being attached to the base plate and the end plate; a first side gear and a second side gear inside of the housing, the first side gear configured for connecting to a first output shaft, the second side gear configured for connecting to a second output shaft; first transmission gears and second transmission gears connected to the housing for rotation with the housing about the center axis, the first transmission gears configured for driving the first side gear, the second transmission gears configured for driving the second side gear, the first transmission gears and second transmission gears being received inside the plurality of rings.

In examples, the base plate extends radially outward past the plurality of rings.

In examples, the differential further includes a ring gear fixed to the base plate, the ring gear being directly radially outward from at least one of the rings.

In examples, the base plate includes a first base plate formed as a single piece with the first hub and a second base plate axially between the first base plate and the plurality of rings.

In examples, the second base plate includes a plurality of first slots receiving one of the first transmission gears and a plurality of second slots receiving one of the second transmission gears.

In examples, all of the plurality of rings are identical.

In examples, each of the plurality of rings includes a plurality of first slots receiving one of the first transmission gears and a plurality of second slots receiving one of the second transmission gears.

In examples, each of the first slots intersects one of the second slots.

In examples, each of the plurality of rings includes a plurality of circumferentially spaced holes passing therethrough, the base plate includes a plurality of circumferentially spaced holes passing therethrough, and the end plate includes a plurality of circumferentially spaced holes passing therethrough, the housing further includes a plurality of first fasteners, each of the first fasteners passing through one of the holes of each ring, one of the holes of the base plate and one of the holes of the end plate to fix the rings, the base plate and the end plate together.

In examples, each of the plurality of rings includes an annular base and a plurality of circumferentially spaced webs extending radially inward from the annular base, each of the webs defining a perimeter of one of the first slots and a perimeter of one of the second slots, each of the webs includes one of the circumferentially spaced holes.

In examples, each of the first transmission gears and each of the second transmission gears extends from the base plate to the end plate.

In examples, each of the first transmission gears includes a non-transmission section that is directly radially outside of the second side gear, and each of the second transmission gears includes a non-transmission section that is directly radially outside of the first side gear.

A differential housing rotatable about a center axis is also provided. The housing includes a first hub section including a base plate and a first hub protruding axially from the base plate; a second hub section including an end plate a second hub protruding axially from the end plate; a plurality of rings stacked together axially between the base plate and the end plate, the plurality of ring being attached to the base plate and the end plate; and a plurality of fasteners connecting the first hub section, the second hub section and the plurality of rings together, the each of the plurality of rings includes an annular base and a plurality of circumferentially spaced webs extending radially inward from the annular base, each of the webs includes a hole through which one of the fasteners passes.

In examples, each of the plurality of rings defines a plurality of sets of slots, each of the sets of slots includes two semi-circular slots that intersect each other, each of the sets of slots being defined between two of the webs.

In examples, the base plate includes a first base plate formed as a single piece with the first hub and a second base plate axially between the first base plate and the plurality of rings, the first base plate includes a plurality of first holes passing therethrough, the second base plate includes a plurality of second holes passing therethrough, each of the first holes being axially aligned with one of the second holes, the first and second holes being radially further from the center axis than an outer circumferential surface of each of the plurality rings.

In examples, the second base plate includes an annular base including the second holes and a plurality of circumferentially spaced webs extending radially inward from the annular base, each of the webs of the second base plate includes a hole through which one of the fasteners passes, the second base plate defining a plurality of sets of slots, each of the sets of slots of the second base plate includes two semi-circular slots that intersect each other, each of the sets of slots of the second base plate being defined between two of the webs of the second base plate.

In examples, the plurality of rings includes at least five rings.

A method of forming a differential is also provided including creating a housing by fixing a plurality of rings to a first hub section and a second hub section axially between the first hub section and the second hub section, the housing configured for being rotatable about a center axis of the differential; inserting first transmission gears into the plurality of rings in first slots formed in the plurality of rings; inserting second transmission gears into the plurality of rings in second slots formed in the plurality of rings; inserting a first side gear into the plurality of rings in driving engagement with the first transmission gears; and inserting a second side gear into the plurality of rings in driving engagement with the second transmission gears.

In examples, the method further includes stamping a plurality of identical plates to form the plurality of rings, the plurality of rings being identical to each other.

In examples, the creating of the housing includes connecting the plurality of rings to one of the first hub section and the second hub section by passing fasteners through the plurality of rings, and then connecting the other of the first hub section and the second hub section to the plurality of rings via the fasteners, the inserting of the first transmission gears, the second transmission gears, the first side gear and the second side gear into the plurality of rings being performed after the connecting of the plurality of rings to one of the first hub section and the second hub section and prior to the connecting of the other of the first hub section and the second hub section to the plurality of rings.

BRIEF DESCRIPTION OF THE DRAWINGS

The present disclosure is described below by reference to the following drawings, in which.

DETAILED DESCRIPTION

Figure 1:
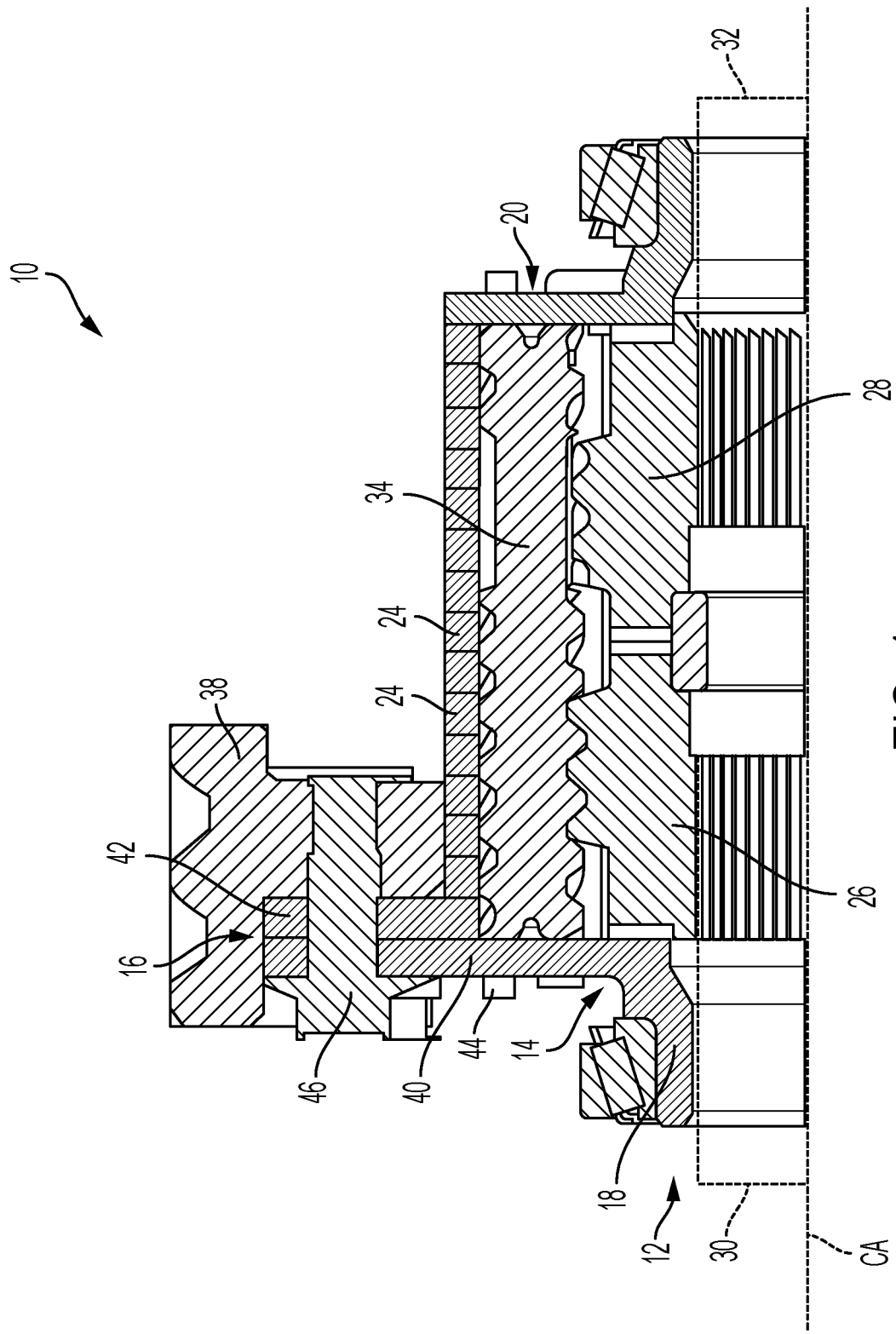
FIG. 1 shows a radial cross-sectional view of a top half of a differential of a motor vehicle drivetrain according to the present disclosure.

FIG. 1 shows a radial cross-sectional view of a differential 10 including a housing 12 rotatable about a center axis CA of the differential 10. The housing 12 includes a first hub section 14 including a base plate 16 and a first hub 18 protruding axially from the base plate 16, and a second hub section 20 including an end plate 22 and a second hub 23 protruding axially from the end plate 22. The housing 12 further includes a plurality of rings 24 stacked together axially between the base plate 16 and the end plate 22. The plurality of rings 24 are attached to the base plate 16 and the end plate 22.

The differential 10 also includes a first side gear 26 and a second side gear 28 inside of the housing 12. The first side gear 26 is configured for connecting to a first output shaft 30 and the second side gear 28 is configured for connecting to a second output shaft 32. Radially outside of gears 26, 28, differential 10 includes first transmission gears 34 and second transmission gears 36 connected to the housing 12 for rotation with the housing 12 about the center axis. The first transmission gears 34 are configured for driving the first side gear 26, and the second transmission gears 36 are configured for driving the second side gear 28. The first transmission gears 34 and second transmission gears 36 being received inside the plurality of rings 24.

The base plate 16 extends radially outward past the plurality of rings 24, and a ring gear 38 is fixed to the portion of base plate 16 that extends radially outward past rings 24. More specifically, the ring gear 38 is directly radially outward from at least one of the rings 24. The base plate 16 includes a first base plate 40 formed as a single piece with the first hub 18 and a second base plate 42 axially between the first base plate 40 and the plurality of rings 24.

Figure 2:
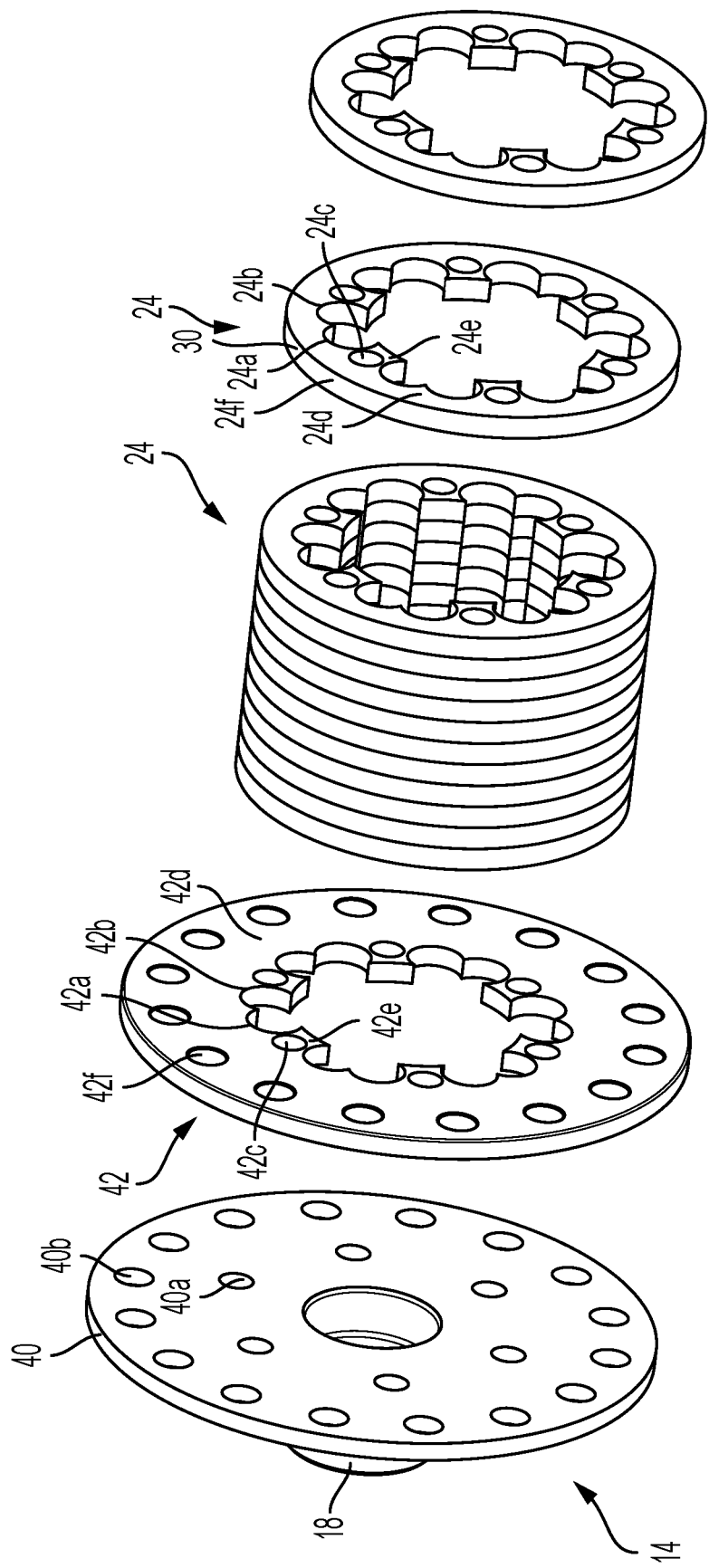
FIG. 2 shows an exploded view of a first hub section and rings of the housing of the differential shown in FIG. 1.
Figure 4:
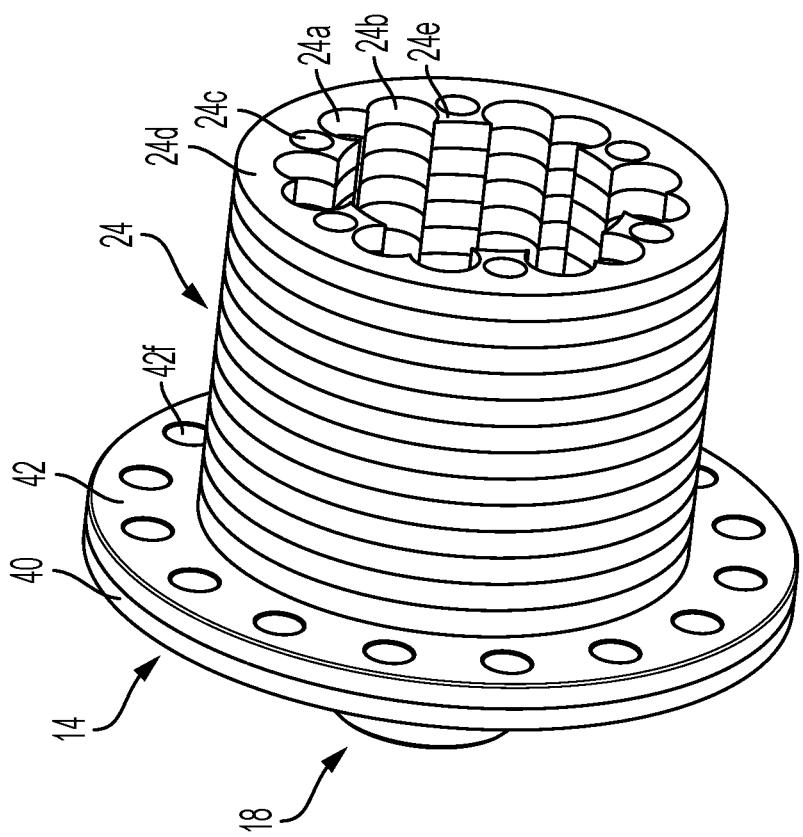
FIG. 4 shows a side perspective view of the housing components shown in FIGS. 2 and 3.
Figure 3:
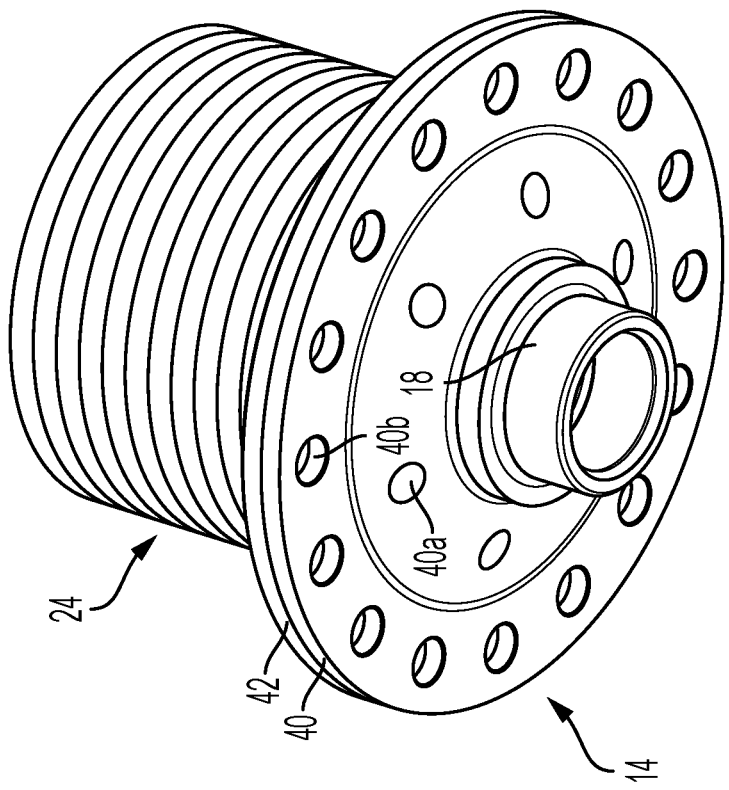
FIG. 3 shows a first hub section-facing perspective view of the housing components shown in FIG. 2 from a base plate end of the housing.

As shown in FIG. 2, each of the plurality of rings 24 defines a plurality of circumferentially spaced pairs of slots, with each of the pairs of slots including a first semi-circular slot 24a and a second semi-circular slot 24b that intersect each other. Each of first slots 24a receives one of the first transmission gears 34 and each of second slots 24b receives one of the second transmission gears 36. Each of rings 24 further includes a plurality of circumferentially spaced fastener-receiving holes 24c passing therethrough. The housing 12 further includes a plurality of first fasteners 44, and each of the first fasteners 44 passes through a respective one of the holes 24c of each ring 24.

Each of plurality of rings 24 includes an annular base 24d and a plurality of circumferentially spaced webs 24e extending radially inward from the annular base 24d. Each of the pairs of slots 24a, 24b is defined between two of the webs 24e. More specifically, each of the webs 24e defines a perimeter of the first slot 24a of one of the slot pairs and a perimeter of the second slot 24b of another of the slot pairs. Each of the webs 24e includes one of the circumferentially spaced holes 24c. In the example shown in FIGS. 1 to 4, all of the plurality of rings 24 are identical, with slots 24a, 24b and holes 24c of the rings 24 being directly aligned with each other. The plurality of rings 24 include at least five rings 24, and advantageously can include at least on ten rings 24.

In the same manner as rings 24, second base plate 42 defines a plurality of circumferentially spaced pairs of slots, with each of the pairs of slots including a first semi-circular slot 42a and a second semi-circular slot 42b that intersect each other. Each of first slots 42a receives one of the first transmission gears 34 and each of second slots 42b receives one of the second transmission gears 36. The second base plate 42 further includes a plurality of circumferentially spaced first fastener-receiving holes 42c passing therethrough. Each of the first fasteners 44 passes through a respective one of the holes 42c of second base plate 42.

The second base plate 42 also includes an annular base 42d and a plurality of circumferentially spaced webs 42e extending radially inward from the annular base 24d. Each of the pairs of slots 42a, 42b is defined between two of the webs 42e. More specifically, each of the webs 42e defines a perimeter of the first slot 42a of one of the slot pairs and a perimeter of the second slot 42b of another of the slot pairs. Each of the webs 42e includes one of the circumferentially spaced holes 42c. In the example shown in FIGS. 1 to 4, slots 42a, 42b and holes 42c are identical to slots 24a, 24b and holes 24c, respectively, and slots 42a, 42b and holes 42c of second base plate 42 are directly aligned with slots 24a, 24b and holes 24c, respectively, of rings 24.

Annular base 42d further includes a plurality of second fastener-receiving holes 42f passing thereof for receiving second fasteners 46 that fix plates 40, 42 together and fix plates 40, 42 to ring gear 38. Fasteners 46 can each include a bolt and a nut.

First base plate 40 also includes a plurality of first fastener-receiving holes 40a passing thereof for receiving first fasteners 44 and a plurality of second fastener-receiving holes 40b passing thereof for receiving second fasteners 46. Each of the plurality of first fastener-receiving holes 40a is axially aligned with one of the holes 42c, and the first and second holes 40a, 42c are radially further from the center axis CA than an outer circumferential surface 24f of each of the plurality rings 24. End plate 22 also includes a plurality of first fastener-receiving holes 22a passing thereof for receiving first fasteners 44.

Accordingly, fasteners 46 extend through plates 40, 42 and at least into ring gear 38; and fasteners 44 extend through plates 22, 40, 42 and rings 24 to fix the components of housing 12—i.e., plates 22, 40, 42 and rings 24-together.

More specifically, each of fasteners 44 extends through one of the holes 40a of first base plate 40, one of the holes 42c of second base plate 42, one of the holes 24c of each of the rings 24, and one of the holes 22a of the end plate 22 to fix the rings 24, the base plate 16 and the end plate 22 together. Fasteners 44 can each include a bolt and a nut. In other examples, the fasteners 44 can be rivets, or plates 22, 40, 42 and rings 24 can be fixed together via brazing or welding.

Figure 5:
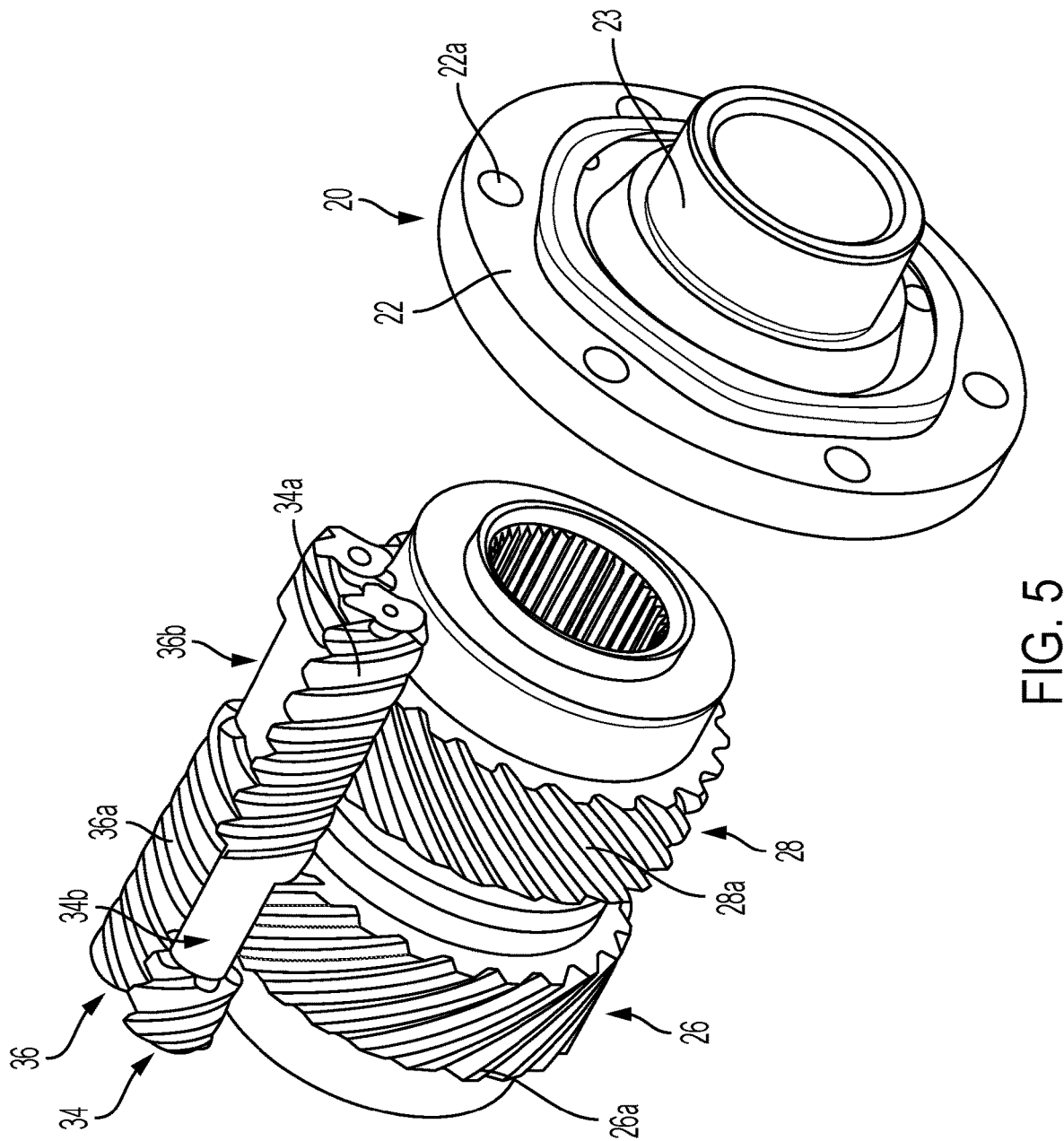
FIG. 5 shows a perspective view of gears and a second hub section of the differential shown in FIG. 1.

As shown in FIG. 1, each of the first transmission gears 34 and each of the second transmission gears 36 extends from the base plate 16 to the end plate 22. As illustrated in FIG. 5, fears 34 each include a transmission section formed by helical teeth 34a that intermesh with diagonal teeth 26a of first side gear 26 and a non-transmission section 34b that is directly radially outside of the second side gear 28 such that gears 34 can extend past second side gear 28 without engaging diagonal teeth 28a of second side gear 28. Similarly, gears 36 each include a transmission section formed by helical teeth 36a that intermesh with diagonal teeth 28a of second side gear 28 and a non-transmission section 36b that is directly radially outside of the first side gear 26 such that gears 34 can extend past first side gear 26 without engaging diagonal teeth 26a of first side gear 26.

A method of forming differential 10 can first include stamping or powder metal forging a plurality of identical metal plates to form the plurality of identical rings 24, stamping or powder metal forging a metal plate to form second base plate 42, stamping or powder metal forging a metal plate and then forming the stamped/forged metal plate to form first hub 18, and stamping or powder metal forging a metal plate and then forming the stamped/forged metal plate to form second hub section 20.

The method can next include creating housing 12 by fixing a plurality of rings 24 to the first hub section 14 and the second hub section 20 axially between the first hub section 14 and the second hub section 20; inserting first transmission gears 34 into the plurality of rings 24 in first slots formed in the plurality of rings 24; inserting the second transmission gears 36 into the plurality of rings 24 in second slots formed in the plurality of rings 24; inserting the first side gear 26 into the plurality of rings 24 in driving engagement with the first transmission gears 34; and inserting the second side gear 28 into the plurality of rings 24 in driving engagement with the second transmission gears 36.

The creating of the housing 12 can include connecting the plurality of rings 24 to one of the first hub section 14 and the second hub section 20 by passing fasteners through the plurality of rings 24, and then connecting the other of the first hub section 14 and the second hub section 20 to the plurality of rings 24 via the fasteners.

The inserting of the first transmission gears 34, the second transmission gears 36, the first side gear 26 and the second side gear 28 into the plurality of rings 24 can be performed after the connecting of the plurality of rings 24 to one of the first hub section 14 and the second hub section 20 and prior to the connecting of the other of the first hub section 14 and the second hub section 20 to the plurality of rings 24.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

REFERENCE NUMERALS 10 differential
12 housing
14 first hub section
16 base plate
18 first hub
20 second hub section
22 end plate
22a plurality of first fastener-receiving holes
23 second hub
24 plurality of rings
24a slots
24b slots
24c holes
24d annular base
24e webs
24f outer circumferential surface
26 first side gear
26a diagonal teeth
28 second side gear
28a diagonal teeth
30 first output shaft
32 second output shaft
34 first transmission gears
34a helical teeth
34b non-transmission section
36 second transmission gears
36a helical teeth
36b non-transmission section
38 ring gear
40 first base plate
40a plurality of first fastener-receiving holes
40b plurality of second fastener-receiving holes
42 second base plate
42a slots
42b slots
42c holes
42d annular base
42e webs
42f plurality of second fastener-receiving holes
44 first fasteners
46 second fasteners

What is claimed is:

1. A differential comprising:
a housing rotatable about a center axis of the differential, the housing including:
a first hub section including a base plate and a first hub protruding axially from the base plate;
a second hub section including an end plate and a second hub protruding axially from the end plate; and
a plurality of rings stacked together axially between the base plate and the end plate, the plurality of rings being attached to the base plate and the end plate, at least two of the plurality of rings being identical;
a first side gear and a second side gear inside of the housing, the first side gear configured for connecting to a first output shaft, the second side gear configured for connecting to a second output shaft; and
first transmission gears and second transmission gears connected to the housing for rotation with the housing about the center axis, the first transmission gears configured for driving the first side gear, the second transmission gears configured for driving the second side gear,
the first transmission gears and second transmission gears being received inside the plurality of rings.

2. The differential as recited in claim 1 wherein the base plate extends radially outward past the plurality of rings.

3. The differential as recited in claim 2 further comprising a ring gear fixed to the base plate, the ring gear being directly radially outward from at least one of the rings.

4. The differential as recited in claim 2 wherein the base plate includes a first base plate formed as a single piece with the first hub and a second base plate axially between the first base plate and the plurality of rings.

5. The differential as recited in claim 4 wherein the second base plate includes a plurality of first slots receiving one of the first transmission gears and a plurality of second slots receiving one of the second transmission gears.

6. The differential as recited in claim 1 wherein all of the plurality of rings are identical.

7. The differential as recited in claim 1 wherein each of the plurality of rings includes a plurality of first slots receiving one of the first transmission gears and a plurality of second slots receiving one of the second transmission gears.

8. The differential as recited in claim 7 wherein each of the first slots intersects one of the second slots.

9. The differential as recited in claim 7 wherein each of the plurality of rings includes a plurality of circumferentially spaced holes passing therethrough, the base plate includes a plurality of circumferentially spaced holes passing therethrough, and the end plate includes a plurality of circumferentially spaced holes passing therethrough,
the housing further including a plurality of first fasteners, each of the first fasteners passing through one of the holes of each ring, one of the holes of the base plate and one of the holes of the end plate to fix the rings, the base plate and the end plate together.

10. The differential as recited in claim 9 wherein each of the plurality of rings includes an annular base and a plurality of circumferentially spaced webs extending radially inward from the annular base, each of the webs defining a perimeter of one of the first slots and a perimeter of one of the second slots, each of the webs including one of the circumferentially spaced holes.

11. The differential as recited in claim 1 wherein each of the first transmission gears and each of the second transmission gears extends from the base plate to the end plate.

12. The differential as recited in claim 11 wherein each of the first transmission gears includes a non-transmission section that is directly radially outside of the second side gear, and
each of the second transmission gears includes a non-transmission section that is directly radially outside of the first side gear.

13. A differential housing rotatable about a center axis, the housing including:
a first hub section including a base plate and a first hub protruding axially from the base plate;
a second hub section including an end plate and a second hub protruding axially from the end plate;
a plurality of rings stacked together axially between the base plate and the end plate, the plurality of rings being attached to the base plate and the end plate; and
a plurality of fasteners connecting the first hub section, the second hub section and the plurality of rings together, each of the plurality of rings including an annular base and a plurality of circumferentially spaced webs extending radially inward from the annular base, each of the webs including a hole through which one of the fasteners passes.

14. The differential housing as recited in claim 13 wherein each of the plurality of rings defines a plurality of sets of slots,
each of the sets of slots includes two semi-circular slots that intersect each other,
each of the sets of slots being defined between two of the webs.

15. The differential housing as recited in claim 13 wherein the base plate includes a first base plate formed as a single piece with the first hub and a second base plate axially between the first base plate and the plurality of rings,
the first base plate including a plurality of first holes passing therethrough, the second base plate including a plurality of second holes passing therethrough,
each of the first holes being axially aligned with one of the second holes,
the first and second holes being radially further from the center axis than an outer circumferential surface of each of the plurality rings.

16. The differential housing as recited in claim 15 wherein the second base plate includes an annular base including the second holes and a plurality of circumferentially spaced webs extending radially inward from the annular base,
each of the webs of the second base plate including a hole through which one of the fasteners passes,
the second base plate defining a plurality of sets of slots,
each of the sets of slots of the second base plate includes two semi-circular slots that intersect each other,
each of the sets of slots of the second base plate being defined between two of the webs of the second base plate.

17. The differential housing as recited in claim 13 wherein the plurality of rings includes at least five rings.

18. A method of forming a differential comprising:
creating a housing by fixing a plurality of rings to a first hub section and a second hub section axially between the first hub section and the second hub section, the housing configured for being rotatable about a center axis of the differential;
inserting first transmission gears into the plurality of rings in first slots formed in the plurality of rings;
inserting second transmission gears into the plurality of rings in second slots formed in the plurality of rings;
inserting a first side gear into the plurality of rings in driving engagement with the first transmission gears; and
inserting a second side gear into the plurality of rings in driving engagement with the second transmission gears.

19. The method as recited in claim 18 further comprising stamping a plurality of identical plates to form the plurality of rings, the plurality of rings being identical to each other.

20. The method as recited in claim 18 wherein the creating of the housing includes connecting the plurality of rings to one of the first hub section and the second hub section by passing fasteners through the plurality of rings, and then
connecting the other of the first hub section and the second hub section to the plurality of rings via the fasteners,
the inserting of the first transmission gears, the second transmission gears, the first side gear and the second side gear into the plurality of rings being performed after the connecting of the plurality of rings to one of the first hub section and the second hub section and prior to the connecting of the other of the first hub section and the second hub section to the plurality of rings.

* * * * *